（12） United States Patent
Tanioka

(10) Patent No.: US 9,372,975 B2
(45) Date of Patent: Jun. 21, 2016

(54) SECURE RECORDING AND SHARING SYSTEM OF VOICE MEMO

(75) Inventor: Hideaki Tanioka, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 508 days.

(21) Appl. No.: 13/330,229

(22) Filed: Dec. 19, 2011

(65) Prior Publication Data

US 2013/0156194 A1 Jun. 20, 2013

(51) Int. Cl.
*H04L 9/28* (2006.01)
*G06F 21/32* (2013.01)
*G06F 21/62* (2013.01)
*H04M 3/56* (2006.01)
*H04M 1/725* (2006.01)
*H04M 3/42* (2006.01)

(52) U.S. Cl.
CPC ............. *G06F 21/32* (2013.01); *G06F 21/62* (2013.01); *H04M 1/7253* (2013.01); *H04M 3/56* (2013.01); *H04M 3/42221* (2013.01); *H04M 2203/30* (2013.01); *H04M 2250/02* (2013.01)

(58) Field of Classification Search
CPC ............ G06F 17/30; G06F 21/41; H04L 9/32
See application file for complete search history.

(56) References Cited

U.S. PATENT DOCUMENTS

2010/0241845 A1* 9/2010 Alonso .................. 713/150
2013/0133055 A1* 5/2013 Ali et al. ................ 726/7

FOREIGN PATENT DOCUMENTS

JP 2005-080110 A 3/2005
JP 2006-217446 A 8/2006

OTHER PUBLICATIONS

Japanese Office Action mailed Apr. 26, 2016 for corresponding Japanese Application No. JP2012-275735.

* cited by examiner

*Primary Examiner* — Brandon Hoffman
*Assistant Examiner* — Nega Woldemariam
(74) *Attorney, Agent, or Firm* — Maschoff Brennan

(57) ABSTRACT

According to an aspect of an embodiment, a system for secure recording and sharing of audio data includes a communication interface, a registration module, a microphone, an encryption engine, and a storage device. The registration module is configured to register an attendee device associated with an attendee for a meeting. The microphone is configured to convert sound generated at the meeting to audio data representing the sound. The encryption engine is configured to encrypt the audio data. The storage device is configured to store and associate the encrypted audio data with the attendee device for subsequent access by the attendee.

21 Claims, 12 Drawing Sheets

| MTG ID | User ID | Name | Location | Attendee Device ID | Public Key | Seq. # |
|---|---|---|---|---|---|---|
| ID1 | UID1 | Name1 | Long: xx3<br>Lat: yy3 | AD_ID1 | P_Key1 | 001, 003, 004, … |
| ID1 | UID2 | Name2 | Long: xx4<br>Lat: yy4 | AD_ID2 | P_Key2 | 002, 003, 004, … |

*Fig. 5*

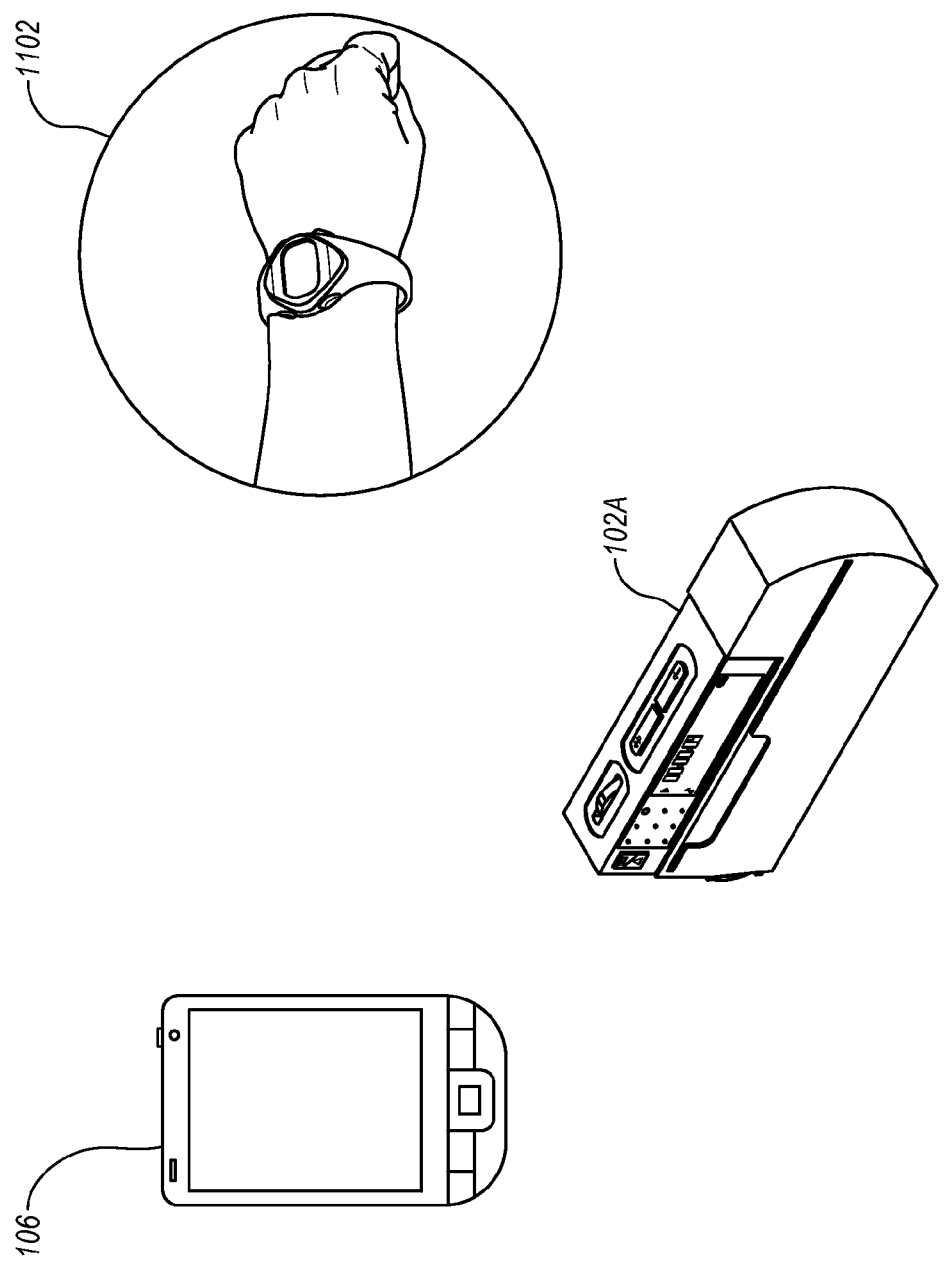

SECURE RECORDING AND SHARING SYSTEM OF VOICE MEMO

FIELD

Example embodiments discussed herein are related to audio recording systems.

BACKGROUND

Unless otherwise indicated herein, the materials described herein are not prior art to the claims in the present application and are not admitted to be prior art by inclusion in this section.

Recording devices are often used to record meetings and other conversations for subsequent reference by individuals that may or may not have been present for the conversation. A recording of a meeting may be shared by posting it to an accessible location, such as the Internet or an Intranet, or emailing the recording or a link to the recording to any desired recipient(s).

When the subject matter of the meeting is confidential in nature, or in other circumstances, it may be desirable to limit access to the recording to the attendees of the meeting. Typically, this may involve the meeting organizer or another individual identifying potential attendees from a meeting invitation list, an attendance list or meeting minutes. However, even if an individual is identified as a potential attendee, it may not be known based on the source information whether the individual actually attended any of the meeting. Thus, unless the meeting organizer was present at the meeting, the meeting organizer may have to take additional steps to confirm the attendees if only confirmed attendees are to be given access to the recording. For instance, the meeting organizer may have to contact each of the potential attendees individually to confirm their attendance, or rely on a confirmed attendee's memory of the meeting to confirm other attendees.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system for secure recording and sharing of audio data includes a communication interface, a registration module, a microphone, an encryption engine, and a storage device. The registration module is configured to register an attendee device associated with an attendee for a meeting. The microphone is configured to convert sound generated at the meeting to audio data representing the sound. The encryption engine is configured to encrypt the audio data. The storage device is configured to store and associate the encrypted audio data with the attendee device for subsequent access by the attendee.

The object and advantages of the embodiments will be realized and achieved by means of the elements and combinations particularly pointed out in the claims.

It is to be understood that both the foregoing general description and the following detailed description are exemplary and explanatory and are not restrictive of the invention, as claimed

BRIEF DESCRIPTION OF THE DRAWINGS

Example embodiments will be described and explained with additional specificity and detail through the use of the accompanying drawings in which:

FIG. 5 illustrates the user records of FIG. 4B updated with audio data segments associated with each of two attendee devices;

FIGS. 11A-11C depict two variations of a method of authenticating an attendee device and associated attendee using images of the same object, all arranged in accordance with at least some embodiments described herein.

DESCRIPTION OF EMBODIMENTS

Some embodiments described herein include a system for secure recording and sharing of audio data that allows only attendees of a meeting to access a recording of the meeting later. Before or during the meeting, the attendee may arrive at the meeting location with an associated attendee device, such as a smartphone, that includes a public key and corresponding private key. A recording device included as part of the system may receive, from the attendee device, information such as location information, which information may be used to confirm that the attendee device, and by extension the attendee, are at the same meeting location as the recording device. The recording device may also receive the attendee device's public key and use the public key to encrypt a recording of the meeting. Later, the recording may be decrypted for the attendee by using the attendee device's private key.

Embodiments of the present invention will now be explained with reference to the accompanying drawings.

Figure 1:
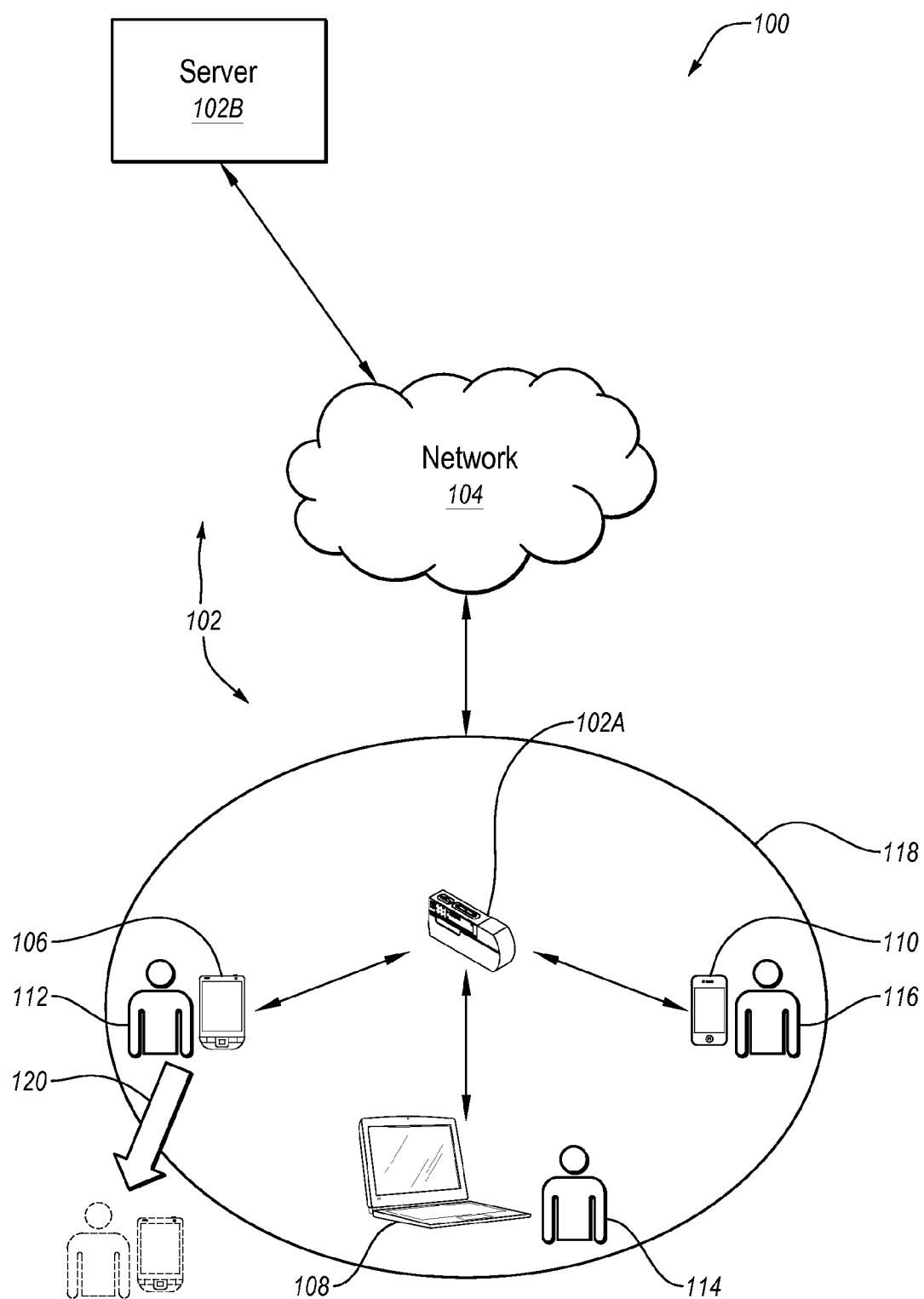
FIG. 1 illustrates an example operating environment in which embodiments of a system for secure recording and sharing of audio data may be implemented.

FIG. 1 illustrates an example operating environment 100 in which embodiments of a system 102 for secure recording and sharing of audio data may be implemented, arranged in accordance with at least some embodiments described herein. The system 102 may include, for instance, a recording device 102A and a server 102B.

In the illustrated embodiment, the operating environment 100 additionally includes a network 104 and a plurality of attendee devices 106, 108, 110 associated with corresponding attendees 112, 114, 116 of a meeting. The meeting may take place at a particular location, designated at 118.

The system 102 in general is configured to provide a secure recording and sharing feature which limits access to a recording of the meeting to attendees of the meeting, such as the attendees 112, 114, 116. In some embodiments, for instance, the system 102 may set up for a meeting, register attendees 112, 114, 116, record the meeting, store the recording securely, and subsequently provide the attendees 112, 114, 116 with access to the recording. Moreover, while the recording of the meeting is described herein in an illustrative embodiment as including an audio recording of the meeting, the recording may alternately or additionally include a video recording of the meeting, and/or electronic files presented and discussed during the meeting such as .ppt documents, .doc documents, and other electronic files or content presented during the meeting.

In general, the network 104 may include one or more wide area networks (WANs) and/or local area networks (LANs) that enable the recording device 102A, the server 102B, and the attendee devices 106, 108, 110 to communicate with each other. In some embodiments, the network 104 may include one or more cellular RF networks and/or one or more wired and/or wireless networks such as, but not limited to, 802.xx networks, Bluetooth access points (APs), wireless APs, IP-based networks, or the like. The network 104 may also include servers that enable one type of network to interface with another type of network.

Each of the attendee devices 106, 108, 110 may be configured to communicate with the recording device 102A, the server 102B, or other devices or systems included in the network 104 or that may access the network 104. Each of the attendee devices 106, 108, 110 may include a network-enabled mobile device such as, but not limited to, a tablet computer, a laptop computer, a mobile phone, a smartphone, a personal digital assistant (PDA), or other suitable mobile device.

Some embodiments described herein confirm an individual's presence at a meeting by confirming the presence of the individual's mobile device at the meeting. For instance, some embodiments confirm the presence of the attendees 112, 114, 116 at the meeting by confirming the presence of the attendee devices 106, 108, 110 before and/or during the meeting. The system 102 may thereby limit access to a recording of the meeting to attendees 112, 114, 116 whose presence at the meeting has been confirmed.

In some embodiments, the recording of the meeting is broken into segments and access to each segment may be contingent upon being present for the segment, or at the beginning of the segment, or the like. For instance, in FIG. 1, the attendee 112 and attendee device 106 may leave the location 118 during part of the meeting, as denoted by the arrow 120. In this example, the attendee 112 may only be permitted to access those recording segments of the meeting during which, or at the beginning of which, the attendee device 106 was confirmed as being present in the location 118 at the meeting.

Figure 2:
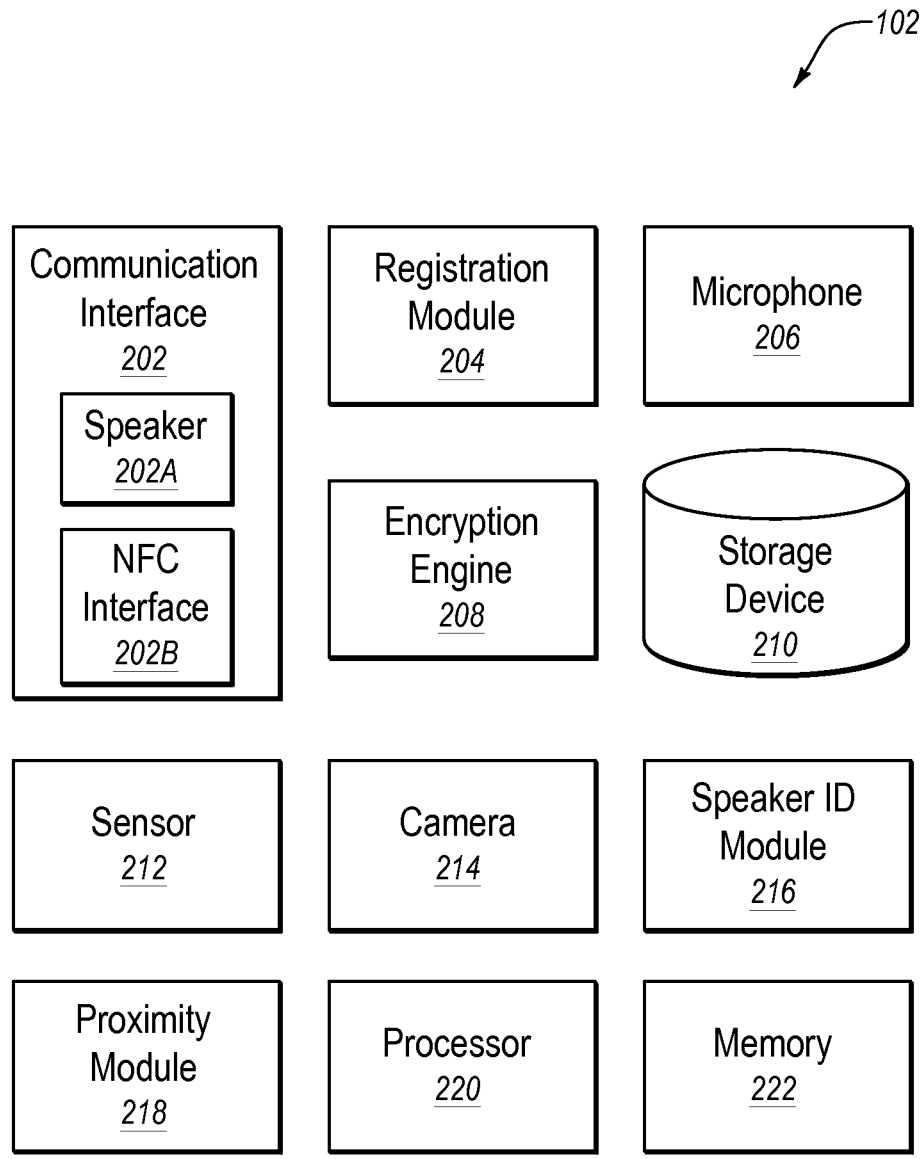
FIG. 2 is a block diagram of an embodiment of the system for secure recording and sharing of audio data of FIG. 1.

FIG. 2 is a block diagram of an embodiment of the system 102 for secure recording and sharing of audio data of FIG. 1. In the illustrated embodiment of FIG. 2, the system 102 includes a communication interface 202, a registration module 204, a microphone 206, an encryption engine 208, and a storage device 210. The configuration and operation of the components of the system 102 according to some embodiments will now be described with combined reference to FIGS. 1 and 2.

In general, the communication interface 202 may include hardware and/or software that enable the system 102 to communicate with other devices and/or systems directly and/or over a network, such as the attendee devices 106, 108, 110 of FIG. 1 to exchange data with the other devices and/or systems. For instance, the communication interface 202 may include one or more of a transmitter, a receiver, an antenna, or the like or any combination thereof. Optionally, the communication interface 202 additionally includes a speaker 202A and/or a near field communication (NFC) interface 202B, additional details of which are provided below.

The registration module 204 is configured to register attendee devices associated with attendees for a meeting. For instance, the registration module 204 may be configured to register any or all of the attendee devices 106, 108, 110 associated with the attendees 112, 114, 116 for the meeting described with respect to FIG. 1.

The microphone 206 is configured to convert sound generated at the meeting to audio data representing the sound. In other embodiments, the system 102 may alternately or additionally include a video capture device for generating video data of the meeting.

The encryption engine 208 may generally be configured to encrypt the audio data generated by the microphone 206. In some embodiments, the audio data is encrypted using a public key of each attendee device 106, 108, 110 registered for a meeting. For instance, if multiple attendee devices 106, 108, 110 are registered for the meeting, multiple encrypted audio data files may be generated, each encrypted using a different public key corresponding to the registered attendee devices 106, 108, 110. The attendee devices 106, 108, 110 may subsequently access and decrypt the encrypted audio data files using corresponding private keys.

Alternately, a common cryptographic key may be used to encrypt the audio data. Separate copies of the common cryptographic key may be encrypted by a corresponding public key of each attendee device 106, 108, 110. The attendee devices 106, 108, 110 may subsequently access and decrypt the encrypted audio data by first decrypting the encrypted common cryptographic key using a corresponding private key, and then decrypt the encrypted audio data using the decrypted common cryptographic key.

The storage device 210 is generally configured to store and associate the encrypted audio data with the attendee devices 106, 108, 110 for subsequent access by the attendees 112, 114, 116. For instance, the storage device 210 may store the encrypted audio data and a database that associates the encrypted audio data with the attendee devices 106, 108, 110 present at the meeting.

In some embodiments, the communication interface 202, registration module 204, microphone 206 and encryption engine 208 are included in the recording device 102A of FIG. 1. The storage device 210 may be included in the recording device 102A or in the server 102B. Alternately or additionally, each of the recording device 102A and the server 102B may include a storage device, such as the storage device 210, for storing and associating the encrypted audio data with the attendee devices 106, 108, 110.

According to some embodiments, the registration module 204 may be further configured to obtain, through the communication interface 202, location data associated with the recording device 102A. A meeting record may be generated that includes meeting information associated with the meeting including at least one of a date and time of the meeting, a scheduled location of the meeting, the location data of the recording device, a title of the meeting, or an identifier of the recording device 102A. The meeting information may be registered through the communication interface 202 with a server, such as the server 102B. A unique meeting identifier associated with the meeting may be received through the communication interface 202 from the server 102B and saved in the meeting record.

In these and other embodiments, the registration module 204 may be configured to register the attendee devices 106, 108, 110 for meetings by, for each attendee device 106, 108, or 110, receiving device information from the attendee device 106, 108, or 110 through the communication interface 202. The device information may include at least one of: a name associated with the attendee 112, 114, or 116, an identifier of the attendee device 106, 108, or 110, location data of the attendee device 106, 108, or 110, and a public key of the attendee device 106, 108, or 110. The registration module 204 or other component of the system 102 may determine whether the attendee device 106, 108, or 110 is within a predetermined proximity of the recording device 102A, e.g., at the same location as the recording device 102A. A user identifier may be issued to the attendee device 106, 108, or 110 and saved in the meeting record together with the device information. The user identifier and the unique meeting identifier may be sent to the attendee device 106, 108, or 110. In some embodiments, some or all of the meeting information and/or device information may be saved in the storage device 210, e.g., in a database, to associate the encrypted audio data with the attendee device 106, 108, or 110.

Although not required, the system 102 depicted in FIG. 2 may further include one or more of a sensor 212, a camera 214, a speaker identification (ID) module 216, a proximity module 218, a processor 220, or a memory 222. One or more of the sensor 212, speaker 202A, camera 214, and/or NFC interface 202B may be used to authenticate attendee devices 106, 108, 110 and associated attendees 112, 114, 116 as being present at a meeting.

For example, the sensor 212 may be included in the recording device 102A. The sensor 212 may be configured to detect vital signs of an attendee 112, 114, or 116 that momentarily holds or otherwise interacts with the recording device 102A. The sensor 212 may be further configured to generate corresponding first vital sign data representing the detected vital signs. The corresponding attendee device 106, 108, or 110 may also detect the attendee's 112, 114, or 116 vital signs and generate corresponding second vital sign data. By comparing the first and second vital sign data, either at the recording device 102A or at the server 102B, both the attendee device 106, 108, or 110 and the attendee 112, 114, or 116 may be authenticated as being present at the meeting in some embodiments if the first and second vital sign data match.

The speaker 202A may be configured to emit ultrasonic data signals. The microphone 206 may be configured to receive ultrasonic data signals. The emitted and received ultrasonic data signals may include information exchanged between the recording device 102A and the attendee devices 106, 108, 110, which information may be used to authenticate the attendee device 106, 108, or 110 and attendee 112, 114, or 116 as being present at the meeting. For instance, the ultrasonic data signal emitted by the speaker 202A may include a public key of the recording device 102A and may be received by the attendee device 106, 108, or 110. In response, the attendee device 106, 108, or 110 may be configured to emit an ultrasonic data signal that is received by the microphone 206 that includes a public key of the attendee device 106, 108, or 110 and an identifier of the attendee device 106, 108, or 110, both encrypted with the public key of the recording device 102A. The encrypted public key and identifier may then be decrypted by, e.g., the processor 220, using a private key of the recording device 102A to obtain the public key and identifier of the attendee device 106, 108, or 110.

In these and other embodiments, the initial transmission power and/or other parameters of the ultrasonic data signal emitted by the speaker 202A may be configured such that only an attendee device 106, 108, or 110 that is within a predetermined proximity of the speaker 202A may receive the ultrasonic data signal. Thus, receiving the ultrasonic data signal from the attendee device 106, 108, or 110 encrypted with the recording device's 102A public key sent in the first ultrasonic data signal may confirm that the attendee device 106, 108, or 110 is within the predetermined proximity.

The camera 214 or other imaging device may be configured to capture an image of an object present or visible at the meeting to generate first image data. An attendee device 106, 108, or 110 may also include a camera or other imaging device to capture an image of the object to generate second image data. The first image data may be used to authenticate the attendee device 106, 108, or 110 as being present at the meeting by comparison with the second image data during registration of the attendee device 106, 108, or 110. For instance, by comparing the first image data and the second image data, either at the recording device 102A or at the server 102B, the attendee device 106, 108, or 110 may be authenticated as being present at the meeting in some embodiments if the comparison determines that the first and second image data each include an image of the same object.

The NFC interface 202B may be configured to exchange data between the recording device 102A and the attendee devices 106, 108, 110 present at the meeting during registration of the attendee devices 106, 108, 110. For instance, the NFC interface 202B may receive device information from the attendee devices 106, 108, 110 that may be used to authenticate the attendee devices 106, 108, 110 as being present at the meeting and/or that may be used to associate the attendee devices 106, 108, 110 with encrypted audio data. Alternately or additionally, the NFC interface 202B may send meeting information to the attendee devices 106, 108, 110 that may be used by the attendee devices 106, 108, 110 after the meeting to access the encrypted audio data.

The speaker ID module 216 may be configured to generate a file of start and stop times of speakers during the meeting. For instance, each of the attendee devices 106, 108, 110 may include a voice profile of the associated attendee 112, 114, 116 and may be configured to detect, based on the voice profile, anytime the attendee device 106, 108, or 110 detects that the attendee 112, 114, or 116 begins or stops speaking Notifications may be sent to the system 102 each time it is detected that the attendee 112, 114, or 116 begins or stops speaking, which notifications may be received at the system 102 through the communication interface 202. Alternately or additionally, the system 102 may receive voice profiles of the attendees 112, 114, 116 and may use the voice profiles to detect each time the attendees 112, 114, 116 start or stop speaking.

The speaker ID module 216 may then generate a file of start and stop times of speakers during the meeting based on the notifications received from the attendee devices 106, 108, 110 or the detection performed by the system 102. The file of start and stop times in some embodiments is saved in the storage device 210 and associated with the attendee devices 106, 108, 110 for subsequent access by the attendees. For instance, when one of the attendees 112, 114, 116 subsequently accesses a recording of the meeting, the attendee 112, 114, or 116 may also access the file of start and stop times and may use the file of start and stop times to determine who is speaking during the recording. The file of start and stop times includes a text file in some embodiments.

The proximity module 218 may be configured to periodically determine during the meeting whether the attendee devices 106, 108, 110 are within a predetermined proximity of the recording device 102A. The predetermined proximity may be a predetermined radius from the recording device 102A and may generally be large enough to include the location 118, which may include a conference room.

For instance, recording device 102A may periodically obtain location data such as may be obtained from a GPS satellite or a network access point. Alternately, the recording device 102A may obtain its own location data once at the beginning of the meeting. The attendee devices 106, 108, 110 may periodically obtain and provide location data of the attendee devices 106, 108, 110 to the recording device 102A. The attendee devices 106, 108, 110 may obtain and provide their location data to the recording device 102A in response to a request from the recording device 102A.

The proximity module 218 may compare the location data from the attendee devices 106, 108, 110 to the location data of the recording device 102A to determine whether the attendee devices 106, 108, 110 are within a predetermined proximity of the recording device 102A at a given time. If no location data is received from any of the attendee devices 106, 108, or 110, the proximity module 218 may determine that the attendee device is not within the predetermined proximity. For instance, while the attendee 112 and attendee device 106 have left the location 118 of the meeting as denoted by the arrow 120, location data received by the system 102A from the attendee device 106 may confirm that the attendee 112 and attendee device 106 are no longer present at the location 118. Alternately or additionally, while the attendee 112 and attendee device 106 have left the location 118, the attendee device 106 may be out of a range of a request from the recording device 102A to provide location data and may thus fail to provide location data to the recording device, which failure may imply that the attendee 112 and attendee device 106 are no longer present at the location 118.

In these and other embodiments, the encryption engine 208 may be configured to record and encrypt the audio data of the meeting in segments corresponding to intervals between the periodic determinations of the proximity module 218. Alternately or additionally, only those encrypted audio data segments for which the attendee device 106, 108, 110 was determined to be within the predetermined proximity of the recording device 102A at the beginning of the corresponding interval may be associated with the attendee device 106, 108, 110.

The processor 220 may be configured to execute computer instructions that cause the system 102 to perform the functions and operations described herein. The computer instructions may be loaded into the memory 222 for execution by the processor 220 and/or data generated, received, or operated on during performance of the functions and operations described herein may be at least temporarily stored in the memory 222.

Figures 3A, 3B, 3C:
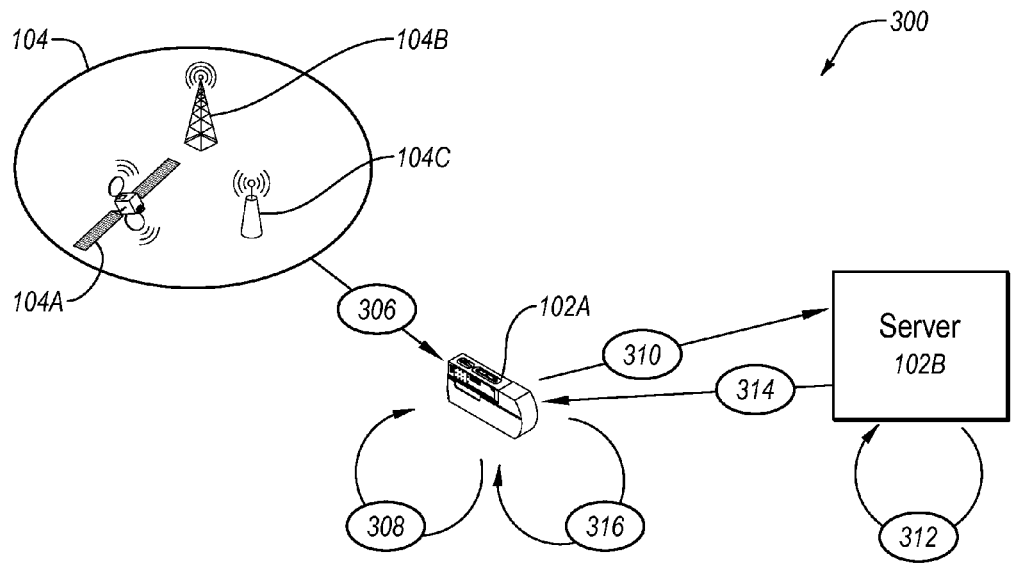
FIG. 3A schematically illustrates a process flow for setting up a meeting.
FIG. 3B illustrates a meeting record that may be generated during the process flow of FIG. 3A by a recording device of the system for secure recording and sharing of audio data of FIG. 1.
FIG. 3C illustrates a meeting database that may be stored by a server of the system for secure recording and sharing of audio data of FIG. 1.

FIG. 3A schematically illustrates a process flow 300 for setting up a meeting, arranged in accordance with at least some embodiments described herein. The process flow 300 may be implemented by the system 102 of FIGS. 1 and 2, for instance. In some embodiments, at least some of the operations in the process flow 300 are performed by the registration module 204 of FIG. 2.

FIG. 3B illustrates a meeting record 302 that may be generated by the recording device 102A during the process flow 300 of FIG. 3A, arranged in accordance with at least some embodiments described herein. FIG. 3C illustrates a meeting database 304 that may be stored by the server 102B, arranged in accordance with at least some embodiments described herein With combined reference to FIGS. 1-3C, the process flow 300 for setting up a meeting may include, at 306, obtaining location data associated with the recording device 102A. The location data may be obtained from the network 104. For instance, the network 104 may include one or more GPS satellites 104A, base stations 104B, wireless APs 104C, or the like, that may provide the recording device 102A with GPS data, mobile network sector data, triangulation data, or other data that represents a location of the recording device 102A.

At 308, the recording device 102A generates the meeting record 302 of FIG. 3B. The meeting record 302 may be at least temporarily saved in the memory 222 of FIG. 2, for instance. In general, the meeting record 302 may include meeting information associated with the meeting. The meeting information may include at least one of a date and time 302A of the meeting, a scheduled location 302B of the meeting—such as a room number identifying the location 118, location data 302C of the recording device 102A—depicted as GPS data in this example, a title 302D of the meeting, and an identifier 302E of the recording device 302E. In some embodiments, the meeting record 302 may additionally include a common encryption key 302F. Alternately or additionally, the meeting information may be extracted from a calendar application of an organizer of the meeting, from a calendar application of one of the attendees 112, 114, 116, and/or may be generated at the recording device 102A.

At 310, the recording device 102A registers the meeting information with the server 102B. Registering the meeting information with the server 102B may include providing some or all of the meeting information to the server 102B.

At 312, the server 102B adds a meeting entry 304A corresponding to the meeting record 302 to the meeting database 304. Additionally, the server 102B generates a unique meeting identifier 304B associated with each meeting for which a meeting entry is added to the meeting database 304. The particular one of the unique meeting identifiers 304B associated with the meeting for meeting entry 304A is denoted 302G. Other entries 304C may be added to the meeting database 304 when meeting information for other meetings is registered at the server 102B, for example.

At 314, the recording device 102A receives the corresponding unique meeting identifier 304B from the server 102B.

At 316, the recording device 102A saves the unique meeting identifier 302G in the meeting record 302.

Figure 4A:
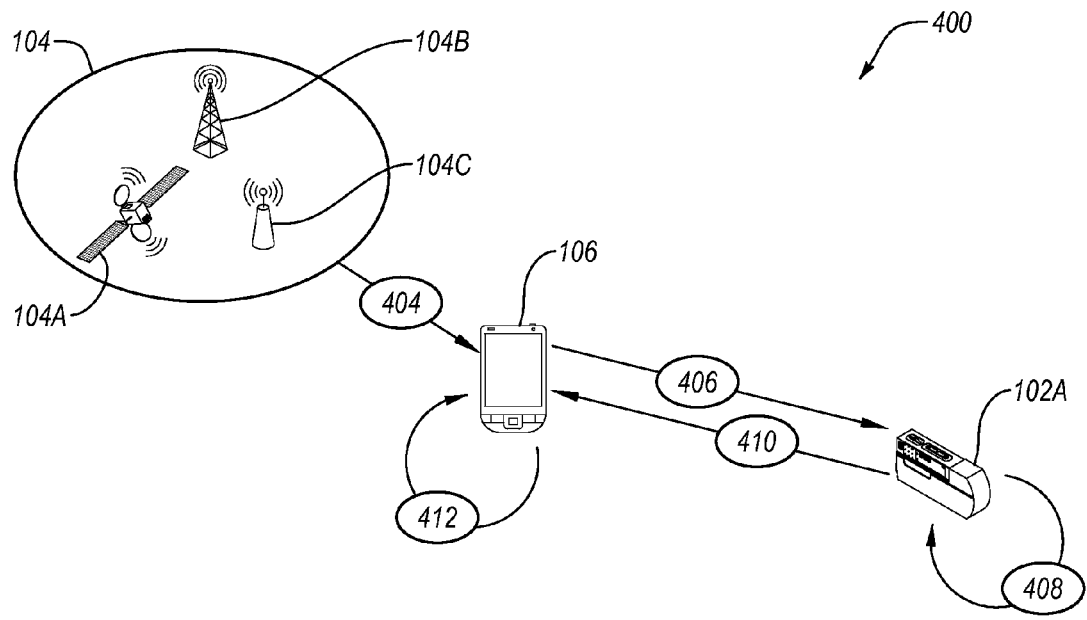
FIG. 4A schematically illustrates a process flow for registering an attendee device for a meeting.

FIG. 4A schematically illustrates a process flow 400 for registering an attendee device for the meeting, arranged in accordance with at least some embodiments described herein. The process flow 400 may be implemented by the system 102 and the attendee device. In some embodiments, operations described as being performed by the system 102, or more particularly by the recording device 102A, may be performed by the registration module 204 (FIG. 2). For simplicity, only registration of the attendee device 106 by the system 102 will be described, with the understanding that registration of the attendee devices 108, 110 may generally proceed in a similar manner.

Figure 4B:
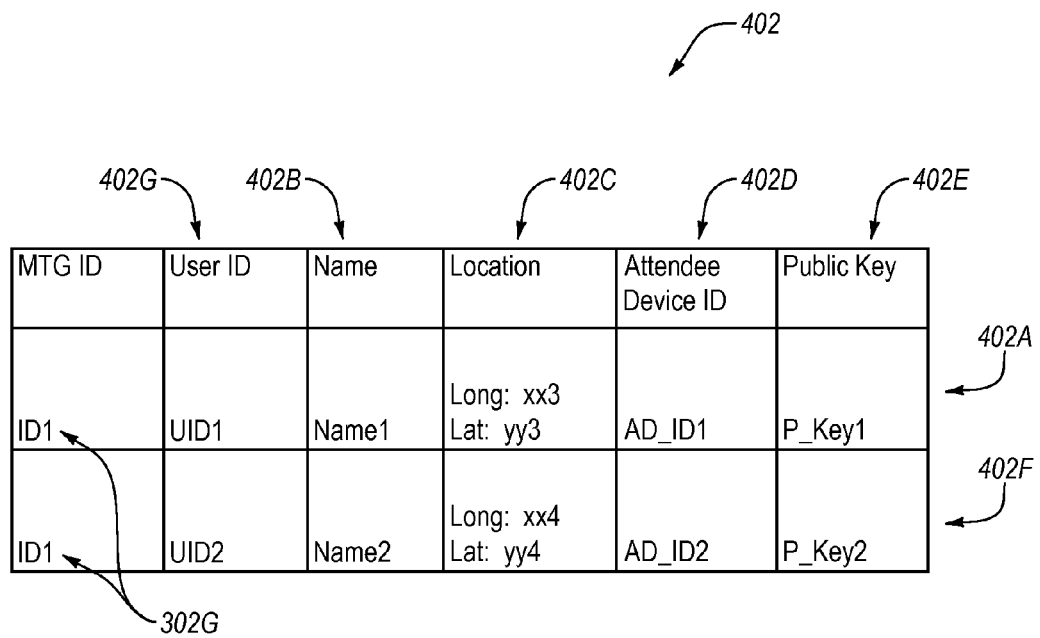
FIG. 4B illustrates user records that may be generated by the recording device during the process flow of FIG. 4A.

FIG. 4B illustrates user records 402 that may be generated by the recording device 102A during the process flow 400 of FIG. 4A, arranged in accordance with at least some embodiments described herein. The user records 402 for all attendees of the meeting may be stored in or associated with the corresponding meeting record 302 (FIG. 3B).

With combined reference to FIGS. 1-4B, the process flow 400 for registering an attendee device may include, at 404, the attendee device 106 obtaining location data associated with the attendee device 106. The location data may be obtained from the network 104 such as from one or more GPS satellite(s) 104A, base station(s) 104B and/or wireless AP(s) 104C, as described with respect to FIG. 3A above.

At 406, the recording device 102A receives device information from the attendee device 106, which device information may be used to create an entry 402A for the attendee device 106 in the user records 402. The device information may include at least one of: a name 402B associated with the attendee 112, location data 402C of the attendee device 106 received at the attendee device 106 at 404, an identifier 402D of the attendee device 106, and a public key 402E of the attendee device 106. The public key 402E of the attendee device 106 may include a pretty good privacy (PGP) public key, or other suitable public key. Additionally, the attendee device 106 includes or has access to a corresponding private key. Other entries 402F may be added to the user records 402 during registration of other attendee devices 108, 110, for example.

At 408, the recording device 102A determines that the attendee device 106 is within a predetermined proximity of the recording device based on the device information. For instance, the proximity module 218 (FIG. 2) of the recording device 102A may compare the location data 402C (FIG. 4B) of the attendee device 106 to the location data 302C (FIG. 3B) of the recording device 102A to determine whether the attendee device 106 is within a predetermined proximity of the recording device 102A. If the attendee device 106 is determined to not be within the predetermined proximity of the recording device 102A, the process flow 400 may terminate. Otherwise, the recording device 102A issues a user identifier 402G to the attendee device 106 and saves the user identifier 402G with the device information in the user records 402. The unique meeting identifier 302G may be included in each of the user records 402 to associate the user records 402 with the corresponding meeting record 302 (FIG. 3B).

More generally, the acts and operations described with respect to 406 and 408 are one example of how the attendee device 106 and the attendee 112 may be authenticated as being present at the meeting. Additional examples of how the attendee device 106 and the attendee 112 may be authenticated as being present at the meeting are described with respect to FIGS. 9A-11C.

At 410, the recording device 102A sends the user identifier 402G and the unique meeting identifier 302G for the meeting to the attendee device 106.

At 412, the attendee device 106 locally saves the user identifier 402G and the unique meeting identifier 302G. After the meeting is completed and a recording has been generated, the attendee device 106 may provide the user identifier 402G and the unique meeting identifier 302G to the server 102B, which may be used by the server 102B to search the meeting database 304 (FIG. 3C) to identify any recordings that may be accessed by the attendee device 106.

The process flow 400 for registering an attendee device for the meeting may be performed prior to the start of a meeting and the recording and encryption of audio data. Alternately or additionally, the process flow 400 for registering an attendee device for the meeting may be performed during the meeting when the attendee device and associated attendee arrive after the meeting has already started.

After the meeting begins, the system 102 may begin recording and encrypting audio data (and/or video) data of the meeting. The recording may begin in response to one of the attendees 112, 114, 116, an organizer of the meeting, or other individual activating a "record" button or providing other appropriate input at the recording device 102A. Alternately or additionally, the recording device 102A may have a sound- or voice-activated recording feature. In some embodiments, the audio data is recorded and encrypted at the recording device 102A. Alternately, the audio data may be captured at the recording device 102A, or more particularly, by the microphone 206, and streamed to the server 102B where it is recorded and encrypted at the server 102B.

In some embodiments, the audio data is recorded and encrypted in segments. The segments may be associated only with those attendee devices 106, 108, 110 that are present during each segment. For instance, the system 102 may periodically determine during the meeting whether each of the attendee devices 106, 108, 110 is within a predetermined proximity of the recording device 102A, as already described above with respect to the proximity module 218. The audio data may be recorded and encrypted in segments corresponding to intervals between the periodic determinations. Each encrypted audio data segment may be associated only with those attendee devices 106, 108, 110 that were determined to be within the predetermined proximity of the recording device 102A at the beginning, during, or at the end of the corresponding interval.

In some embodiments, the audio data segments are associated with corresponding attendee devices 106, 108, 110 by updating the corresponding user records 402 (FIG. 4B). For example, FIG. 5 illustrates the user records 402 of FIG. 4B updated with the audio data segments 502 associated with each of two of the attendee devices 106, 108, 110, arranged in accordance with at least some embodiments described herein. As previously indicated, the first entry 402A may correspond to the attendee device 106. FIG. 5 illustrates that audio data segments 001, 003, and 004 have been associated with attendee device 106 by listing the audio data segments in the entry 402A in user records 402 that corresponds to the attendee device 106. According to this example, the audio data segment 002 is not listed in the associated audio data segments 502 of entry 402A corresponding to the attendee device 106 since the attendee device 106 was determined to not be within the proximity of the recording device 102A when the determination was made for audio data segment 002.

As another example, the entry 402F in the user records 402 may correspond to the attendee device 108. As depicted in FIG. 5, audio data segment 001 is not associated with the attendee device 108. It may be the case that the attendee device 108 registered for the meeting, left with the attendee 114 and was gone when the meeting started, and then returned with the attendee 114 by the time audio data segment 002 started. Alternately or additionally, the attendee 114 and the attendee device 108 may have arrived after the meeting started without already being registered and then registered according to the process flow 400 of FIG. 4A during the meeting.

In embodiments in which the audio data is not segmented, an attendee device that arrives and registers after the meeting starts may be associated with and have access to all of the audio data for the meeting. Alternately, in embodiments in which the audio data is segmented, the recording device 102A may be associated only with those audio data segments for which the attendee device was present. For instance, if the attendee device 108 arrived in the middle of the audio data segment 001 after proximity detection was already performed for the audio data segment 001, the attendee device 108 may not be associated with the audio data segment 001 at all, but may be associated with subsequent audio data segments 002, 003, 004 if the attendee device 108 is determined to be within the proximity of the recording device 102A at the beginning, or during, or at the end of each of those audio data segments.

The audio data, whether in a single file or in segments that may also be embodied as files, may be encrypted separately by each of the public keys 402E (FIG. 4B) corresponding to the attendee devices 106, 108, 110 to generate separate encrypted audio data files or separate encrypted audio data segments for each of the attendee devices 106, 108, 110. Alternately, the audio data may be encrypted with the common cryptographic key 302F (FIG. 3B) associated with the meeting to create a single encrypted audio data file or a single encrypted instance of each audio data segment, and the common cryptographic key 302F may be separately encrypted with each of the public keys 402E to generate separate encrypted common cryptographic keys for each of the attendee devices 106, 108, 110.

Figure 6:
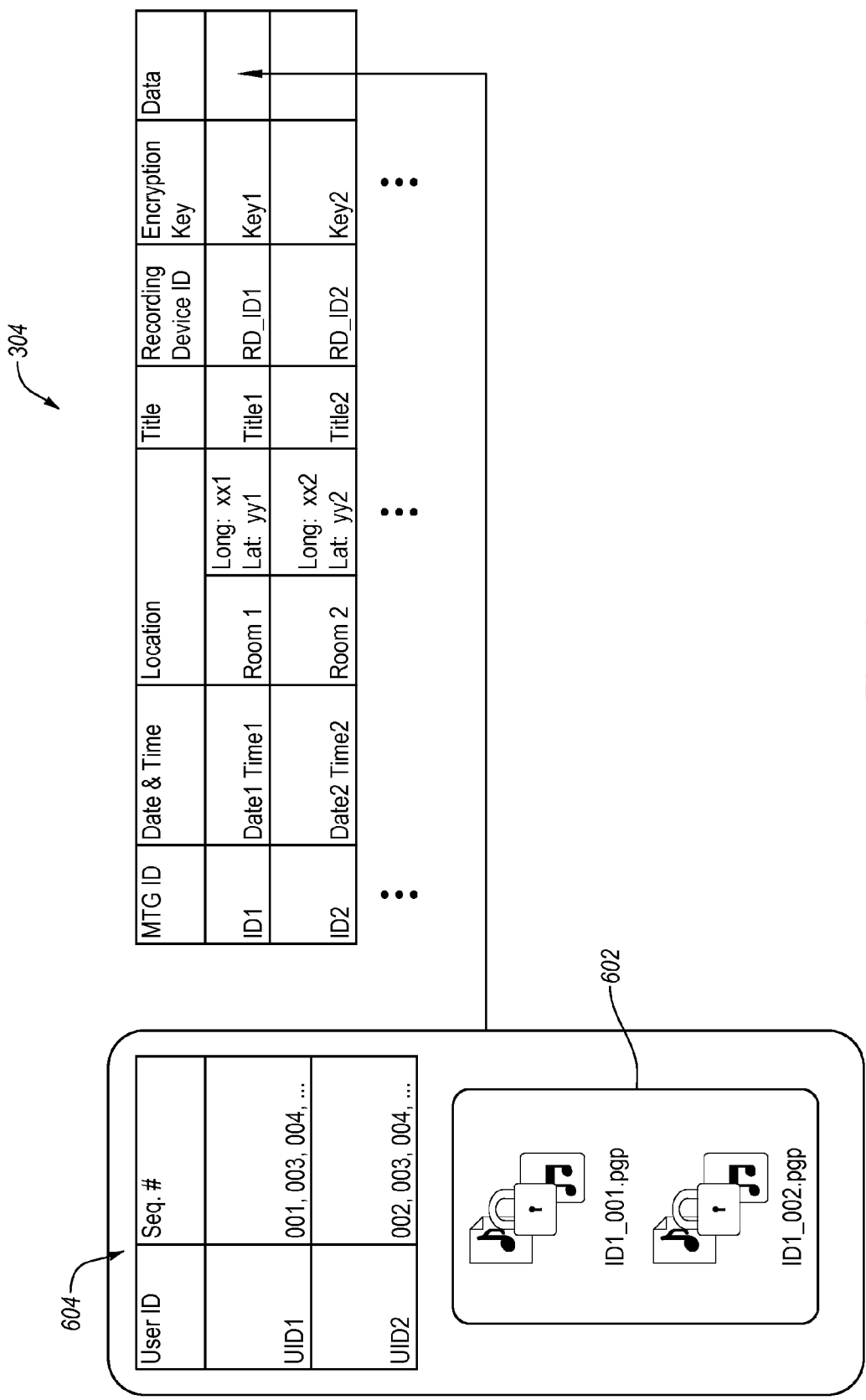
FIG. 6 illustrates encrypted audio data that may be added to the meeting database of FIG. 3C.

FIG. 6 illustrates encrypted audio data 602 that may be added to the meeting database 304 of FIG. 3C, arranged in accordance with at least some embodiments described herein. In the example of FIG. 6, the encrypted audio data 602 may be embodied as encrypted audio data segments. The filename for each encrypted audio segment may include the unique meeting identifier, e.g., ID1 in the present embodiment, of the meeting during which the audio data was recorded and encrypted, and the audio data segment number, e.g., 001 and 002 in the present embodiment.

The encrypted audio data 602 may be uploaded to the server 102A and added to the meeting database 304 with a correlation table 604 correlating user identifiers assigned to attendee devices 106, 108, 110 that were determined to be within the predetermined proximity of the recording device 102A for at least one interval associated with the audio data segments, and associated encrypted audio data segments.

Figure 7:
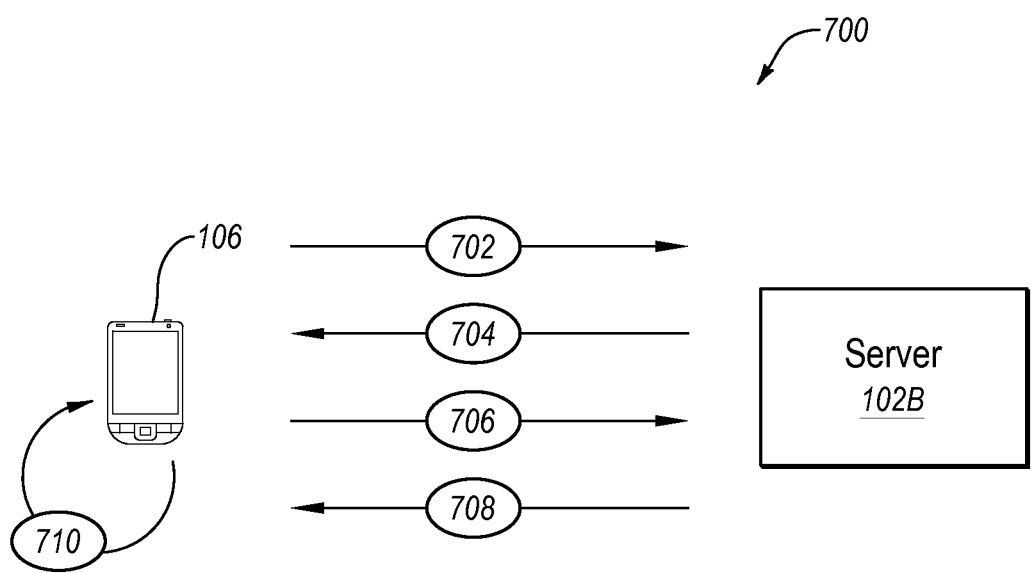
FIG. 7 schematically illustrates a process flow for accessing encrypted audio data.

FIG. 7 schematically illustrates a process flow 700 for accessing encrypted audio data, arranged in accordance with at least some embodiments described herein. The process flow 700 may be implemented by any of the attendee devices 106, 108, 110 or virtually any network-connected device of the associated attendee 112, 114, 116 that has or may obtain the private key of the attendee device 106, 108, 110 and the data used to identify and retrieve the encrypted audio data. For simplicity, access of the encrypted audio data by the attendee device 106 will be described, with the understanding that the other attendee devices 108, 110 may access the encrypted audio data in a similar manner.

At 702, the attendee device 106 sends the unique meeting identifier 302G (FIG. 4B) of the desired meeting and the user identifier 402G (FIG. 4B) to the server 102B to request a list of recorded data associated with the attendee device 106. The server 102B may use the unique meeting identifier 302G and the user identifier 402G to query the meeting database 304 (FIG. 6) for all encrypted audio data associated with the meeting and the attendee device 106. The server 102B may send a list of encrypted audio data, such as a list of associated encrypted audio data segments 502 (FIG. 5) returned by the query to the attendee device 106.

At 704, the attendee device 106 receives the list of encrypted audio data segments corresponding to the unique meeting identifier and the user identifier from the server 102B.

At 706, the attendee device 106 sends a request for at least one of the encrypted audio data segments to the server 102B. The attendee device 106 may accept user input from the attendee 112 that determines which of the encrypted audio data segments to request, or the attendee device 106 may automatically request all of the encrypted audio data segments in some embodiments. The server 102B may retrieve the encrypted audio data segments identified in the request from, e.g., the storage device 210 of FIG. 2, and send the encrypted audio data segments to the attendee device 106.

At 708, the attendee device 106 receives the encrypted audio data segments from the server 102B.

At 710, the attendee device 106 decrypts the encrypted audio data segments with the private key of the attendee device 106 to generate decrypted audio data, and renders the decrypted audio data.

Decrypting the encrypted audio data segments with the private key of the attendee device 106 may include decrypting encrypted audio data segments that were encrypted with the public key of the attendee device 106. Alternately, decrypting the encrypted audio data segments with the private key of the attendee device may include decrypting the encrypted common cryptographic key that was encrypted with the public key of the attendee device 106 and decrypting the encrypted audio data segments that were encrypted with the common cryptographic key using the decrypted common cryptographic key.

In some embodiments, the attendee 112 may desire to access the encrypted audio data using a device other than the attendee device 106. In these and other embodiments, the other device may obtain from the attendee device 106 the unique meeting identifier, the user identifier, and the private key of the attendee device 106, for instance, such that the attendee 112 may access the encrypted audio data using the other device in an analogous manner as described with respect to FIG. 7.

Figure 8:
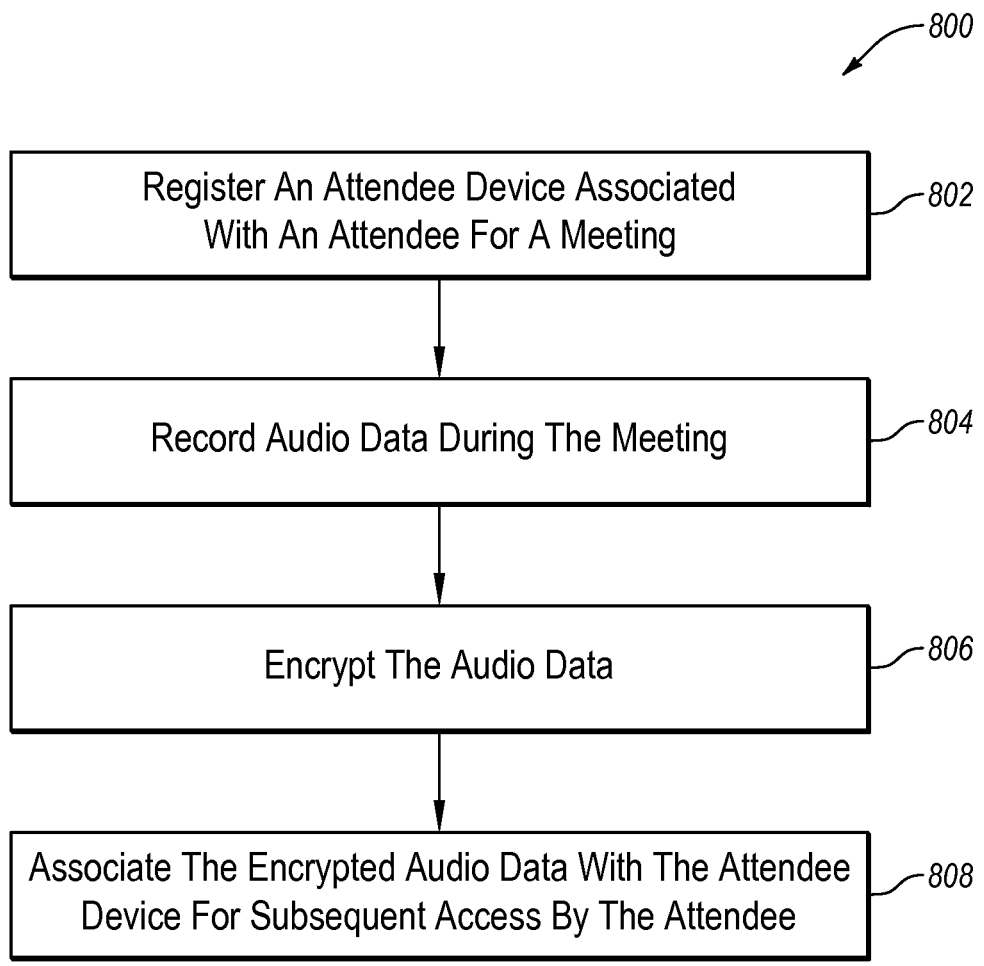
FIG. 8 is a flowchart of an example method for secure recording and sharing of recorded data.

FIG. 8 is a flowchart of an example method 800 for secure recording and sharing of recorded data, arranged in accordance with at least some embodiments described herein. In some embodiments, the method 800 is performed in whole or in part by the system 102 including the recording device 102A and/or the server 102B. While the method 800 and other examples are described herein in the context of securely recording and sharing audio data, video data recorded during a meeting, electronic documents shared during a meeting, or other content shared during a meeting may be securely recorded and shared in an analogous manner as will be appreciated by those of skill in the art with the benefit of the present disclosure.

The method 800 may begin at block 802 in which an attendee device associated with an attendee is registered for a meeting. Registering an attendee device associated with an attendee for a meeting may include one or more of the acts or operations described with respect to the process flow 400 of FIG. 4A. More generally, registering an attendee device associated with an attendee for a meeting includes authenticating the attendee device and the attendee as being present at the meeting. Various authenticating examples are described below with respect to FIGS. 9A-11C.

At block 804, audio data is recorded during the meeting.

At block 806, the audio data is encrypted.

At block 808, the encrypted audio data is associated with the attendee device for subsequent access by the attendee. The encrypted audio data may be associated with the attendee device by, for example, storing data in a meeting database, such as the meeting database 304 of FIG. 6, where the data includes at least a unique meeting identifier, a user identifier of the attendee device, and a correlation between the user identifier and one or more audio data segments associated with the user identifier as described herein.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 800 may further include one or more of the outlined steps and operations described with respect to FIGS. 1-7, such as, but not limited to, the outlined steps and operations of the process flow 300 of FIG. 3A for setting up a meeting, the outlined steps and operations of the process flow 400 of FIG. 4A for registering an attendee device for the meeting, the outlined steps and operations for recording and encrypting audio data in segments generally described with respect to FIGS. 4B-5, the outlined steps and operations for uploading the encrypted audio data segments to the server 102B generally described with respect to FIG. 6, and the outlined steps and operations of the process flow 700 of FIG. 7 for accessing encrypted audio data.

Alternately or additionally, the method 800 may further include receiving a first notification from the attendee device during the meeting that indicates that the attendee has begun speaking. The attendee device may be configured to generate and send the first notification anytime the attendee device detects, based on a voice profile of the attendee, that the attendee begins speaking. A second notification may be received from the attendee device during the meeting that indicates that the attendee has stopped speaking. The attendee device may be configured to generate and send the second notification anytime the attendee device detects, based on the voice profile of the attendee, that the attendee has stopped speaking. A file of start and stop times of speakers may be generated during the meeting based on the first and second notifications received from the attendee device and any other attendee devices associated with other attendees present at the meeting. The file of start and stop times may be associated with the attendee device and the any other attendee devices for subsequent access by the attendee and other attendees. The file may be encrypted with the audio data in some embodiments.

Alternately or additionally, the method 800 may further include receiving multiple voice profiles of attendees of the meeting from attendee devices associated with the attendees. Based on the voice profiles, speaker information including which of the attendees is speaking at any given time during the meeting and corresponding start and stop times may be detected. A file of start and stop times of speakers during the meeting may be generated based on the detected speaker information. The file of start and stop times may be associated with the attendee devices for subsequent access by the associated attendees. The file may be encrypted with the audio data in some embodiments.

Moreover, as previously indicated, registering an attendee device associated with an attendee for a meeting, as described with respect to block 802, may generally include authenticating the attendee device and the attendee as being present at the meeting. Various examples of authenticating the attendee device and the attendee as being present at the meeting will now be described with respect to FIGS. 9A-11C. The methods of authenticating the attendee device and the attendee described with respect to FIGS. 9A-11C may be substituted in the process flow 400 of FIG. 4 for the authentication performed by receiving location data from the attendee device 106 and comparing it to location data of the recording device 102A. For simplicity, FIGS. 9A-11C will be described in the context of authenticating the attendee device 106 and the attendee 112, with the understanding that the attendee devices 108, 110 and attendees 114, 116 may be analogously authenticated.

Figure 9A:
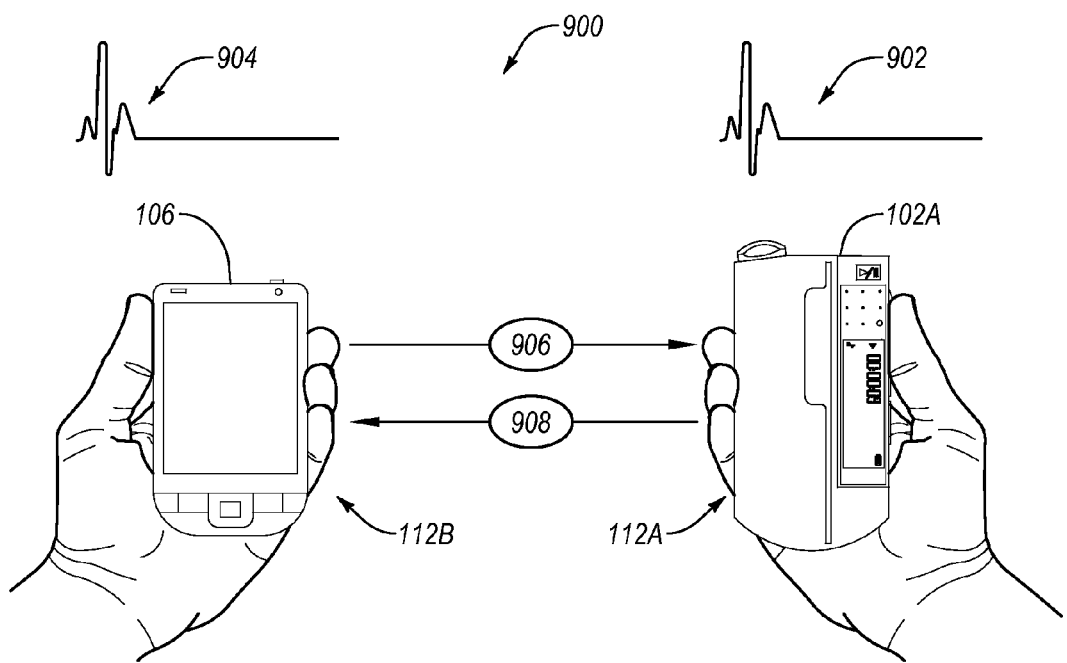
FIG. 9A depicts a method of authenticating an attendee device and an associated attendee based on vital signs of the attendee.

For example, FIG. 9A depicts a method 900 of authenticating the attendee device 106 and the attendee 112 based on vital signs of the attendee 112, arranged in accordance with at least some embodiments described herein. In the illustrated embodiment, each of the attendee device 106 and the recording device 102A may include a sensor, such as the sensor 212 of FIG. 2, that is configured to detect an individual's vital signs when held by the individual.

In the example of FIG. 9A, the recording device 102A and the attendee device 106 are each held in one of the hands 112A, 112B of the attendee 112. Each of the recording device 102A and the attendee device 106 separately detects the attendee's 112 vital signs 902, 904, respectively represented at each of the recording device 102A and the attendee device 106 by first data (not shown) and second data (not shown). The vital signs 902, 904 may include the heart rate of the attendee in some embodiments.

At 906, the attendee device 106 sends the second data representing the vital signs 904 of the attendee 112 to the recording device 102A along with device information of the attendee device 106. The recording device 102A determines whether the attendee device 106 and the attendee 112 are present at the meeting by comparing the first data to the second data to confirm whether they represent vital signs 902, 904 for the same person, e.g., the attendee 112. For instance, if the first data and the second data are the same or substantially the same, the recording device 102A may determine that the attendee device 106 and the attendee 112 are both present at the meeting. The first data and the second data may be considered substantially the same if they are within an acceptable deviation from each other.

In response to authenticating the attendee device 106 and the attendee 112 as present, e.g., as being within a predetermined proximity of the recording device 102A, the recording device 102A may issue and send a user identifier and unique meeting identifier to the attendee device 106 at 908, and the attendee device 106 may save the user identifier and the unique meeting identifier as described with respect to operations 410 and 412 of FIG. 4A. Alternately or additionally, the recording device 102A and/or attendee device 106 may perform other operations as described herein to be able to associate encrypted audio data with the attendee device 106 for subsequent access by the attendee device 106.

Figure 9B:
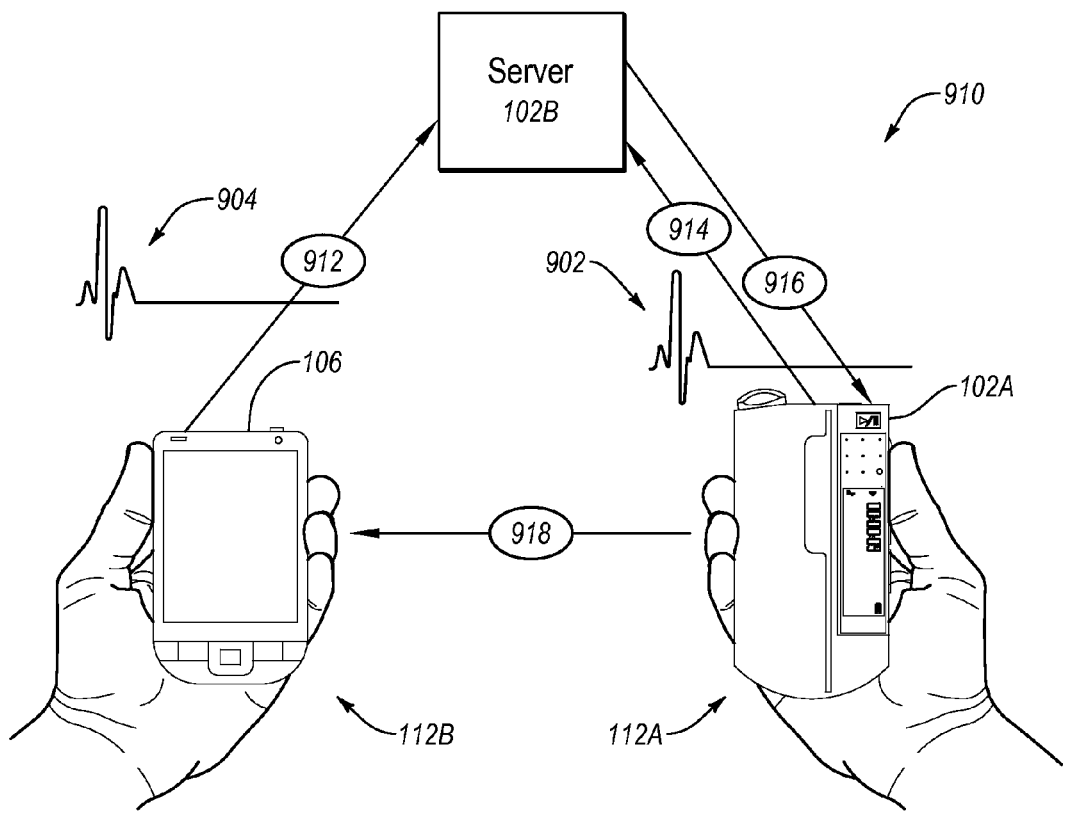
FIG. 9B depicts another method of authenticating an attendee device and an associated attendee based on vital signs of the attendee.

FIG. 9B depicts another method 910 of authenticating the attendee device 106 and the attendee 112 based on vital signs of the attendee 112, arranged in accordance with at least some embodiments described herein. FIG. 9B is similar in some respects to FIG. 9A. For instance, in FIG. 9B, each of the attendee device 106 and the recording device 102A may include a sensor, such as the sensor 212 of FIG. 2, that is configured to detect an individual's vital signs when held by the individual. Similarly, each of the recording device 102A and the attendee device 106 are held in one of the hands 112A, 112B of the attendee to separately detect vital signs 902, 904 which are then represented on the recording device 102A and the attendee device 106 by the first data and the second data, respectively.

At 912, the attendee device 106 sends the second data representing the vital signs 904 of the attendee 112 to the server 102B along with device information of the attendee device 106. As described above, the device information may include, but is not limited to, a device identifier of the attendee device 106.

At 914, the recording device 102A sends the first data representing the vital signs 902 of the attendee 112 to the server 102B.

The server 102B then determines whether the attendee device 106 and the attendee 112 are present at the meeting by comparing the first data to the second data to confirm whether they represent vital signs 902, 904 for the same person, e.g., the attendee 112. For instance, if the first data and the second data are the same or substantially the same, the server 102B may determine that the attendee device 106 and the attendee 112 are both present at the meeting.

If the server 102B determines that the attendee device 106 and the attendee 112 are both present at the meeting, the server 102B sends confirmation to the recording device along with the device information of the attendee device 106 to the recording device 102A, which is received by the recording device 102A at 916.

The recording device 102A may then issue and send a user identifier and unique meeting identifier to the attendee device 106 at 918, and the attendee device 106 may save the user identifier and the unique meeting identifier as described with respect to operations 410 and 412 of FIG. 4A. Alternately or additionally, the recording device 102A and/or attendee device 106 may perform other operations as described herein to be able to associate encrypted audio data with the attendee device 106 for subsequent access by the attendee device 106.

Figure 10A:
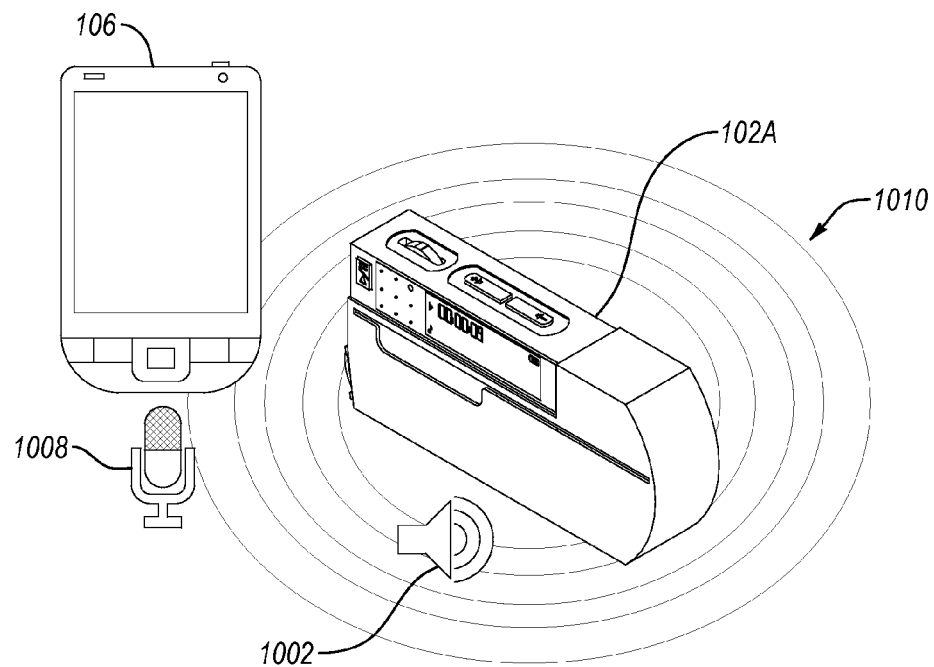
FIGS. 10A-10B depict a method of authenticating an attendee device and associated attendee by exchanging ultrasonic data signals.
Figure 10B:
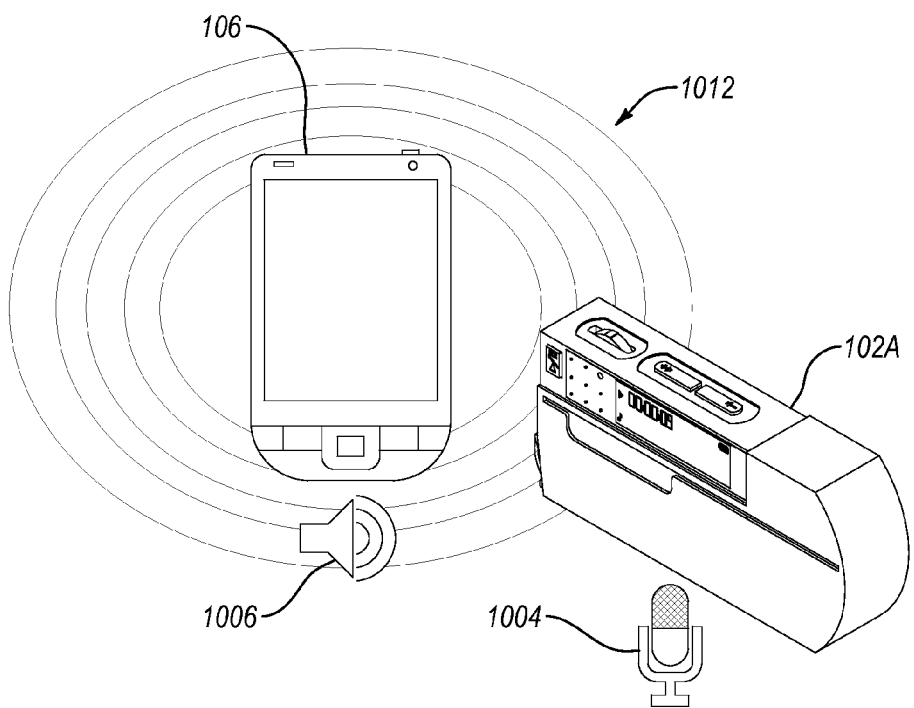

FIGS. 10A-10B depict a method of authenticating the attendee device 106 and the attendee 112 by exchanging ultrasonic data signals, arranged in accordance with at least some embodiments described herein. In the illustrated embodiment, each of the recording device 102A and the attendee device 106 may include a speaker, such as the speaker 202A of FIG. 2, that is configured to emit ultrasonic data signals, and a microphone, such as the microphone 206 of FIG. 2, that is configured to receive ultrasonic data signals. Embodiments of such a speaker and microphone of the recording device 120A are denoted in FIGS. 10A-10B at 1002 and 1004, respectively. Embodiments of such a speaker and microphone of the attendee device 106 are denoted in FIGS. 10A-10B at 1006 and 1008, respectively.

As depicted in FIG. 10A, the recording device 102A may broadcast a first ultrasonic data signal 1010 including a public key of the recording device 102A and the unique meeting identifier from the speaker 1002. The first ultrasonic data signal 1002 may be received by the microphone 1008 of the attendee device 106 where it is demodulated to obtain the public key of the recording device 102A and the unique meeting identifier. The initial transmission power and/or other parameters of the first ultrasonic data signal 1010 may be configured such that only attendee devices within a predetermined proximity of the recording device 102A, such as within about three to five meters of the recording device 102A, may receive the first ultrasonic data signal 1010, thereby ensuring that the attendee device 106 is present at the meeting if a response is received from the attendee device 106 as described with respect to FIG. 10B.

To register for the meeting, the attendee device 106 encrypts the public key and device information, such as a device identifier, of the attendee device 106 with the public key of the recording device 102A. As depicted in FIG. 10B, the attendee device 106 may then broadcast a second ultrasonic data signal 1012 including the encrypted public key and device information of the attendee device 106 from the speaker 1006. The second ultrasonic data signal 1012 may be received by the microphone 1004 of the recording device 102A where it is demodulated and decrypted using a corresponding private key of the recording device 102A to obtain the public key and device information of the attendee device 106.

In some embodiments, the recording device 102A may then issue and send a user identifier to the attendee device 106, e.g., in an ultrasonic data signal or other suitable signal, and the attendee device 106 may save the user identifier and the previously received unique meeting identifier as generally described with respect to operations 410 and 412 of FIG. 4A. Alternately or additionally, the recording device 102A and/or attendee device 106 may perform other operations as described herein to be able to associate encrypted audio data with the attendee device 106 for subsequent access by the attendee device 106

Figure 11B:
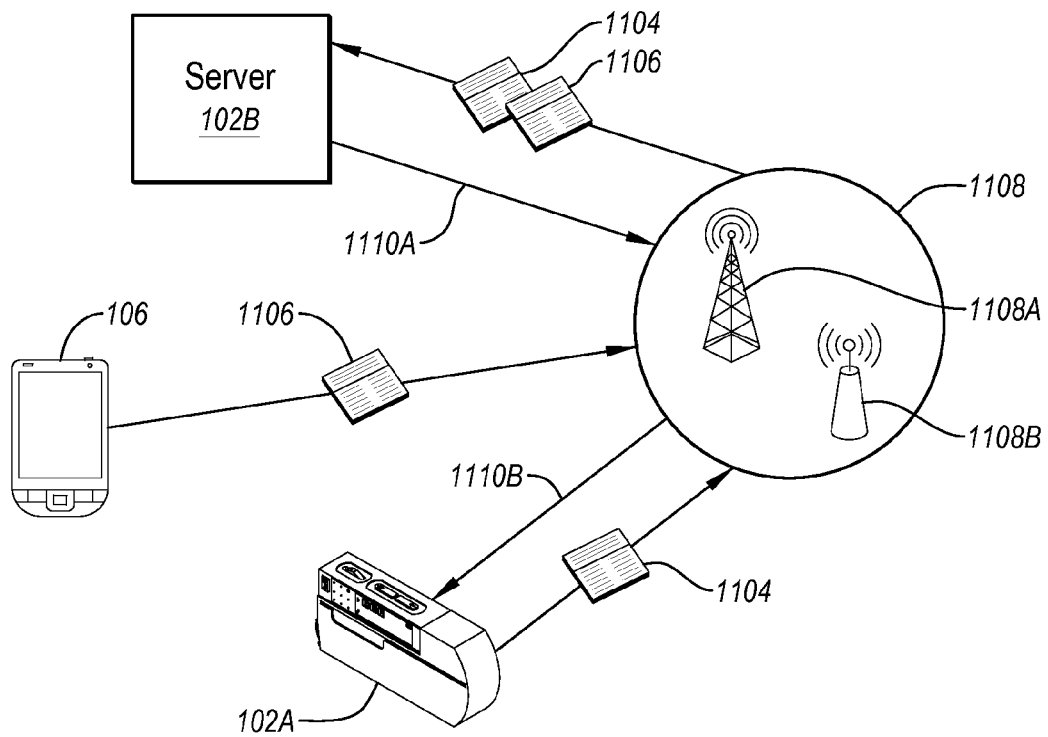
Figure 11C:
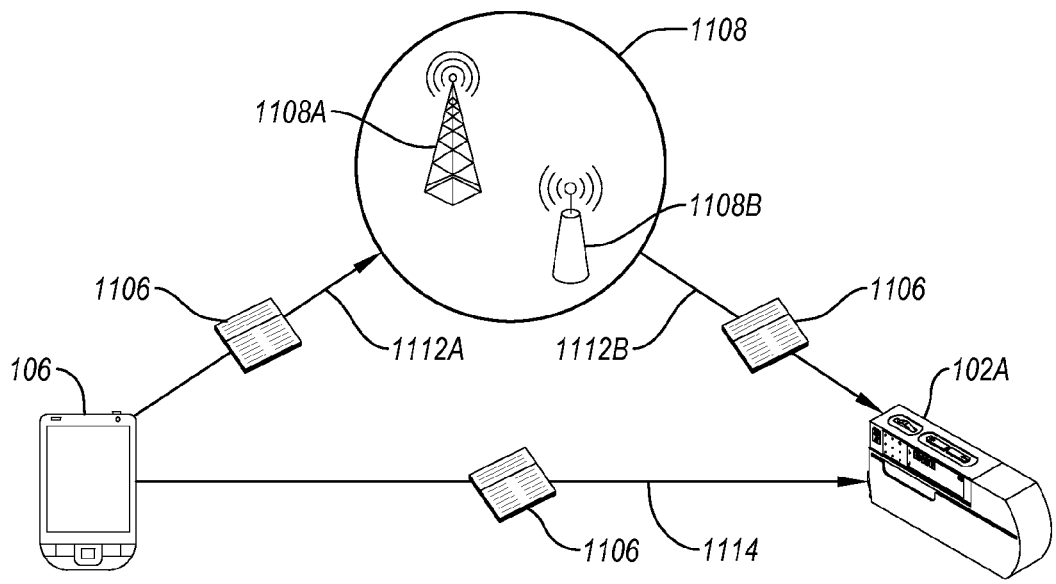

FIGS. 11A-11C depict two variations of a method of authenticating the attendee device 106 and the attendee 112 using images of the same object, arranged in accordance with at least some embodiments described herein. In the illustrated embodiment, each of the recording device 102A and the attendee device 106 may include a camera or other image-capturing device, such as the camera 214 of FIG. 2, that is configured to capture an image of an object that is present or visible at the meeting. For instance, each of the recording device 102A and the attendee device 106 may capture an image of an object 1102, such as a hand and wristwatch of the attendee 112, or other agreed-upon object. While the resulting images may not be identical, the images may be subsequently compared and matched to determine whether the images are of the same object, which indicates in some embodiments that the attendee device 106 is within a predetermined proximity of the recording device 1102.

More generally, the recording device 102A may be configured to capture first data 1104 (FIG. 11B) representing at least one of: an image of the object 1102, location data representing a location of the recording device 102A, ambient information such as humidity or temperature or the like that is associated with the location of the recording device 102A, or other information that is specific to the location of the recording device 102A and thus serves as a "fingerprint" of the location.

Similarly, the attendee device 106 may be configured to capture second data 1106 (FIGS. 11B and 11C) representing at least one of: an image of the object 1102, location data representing the location of the attendee device 106, ambient information that is associated with the location of the attendee device 106, or other information that is specific to the location of the attendee device 106 and thus serves as a "fingerprint" of the location.

The first and second data 1104, 1106 may then be compared, either at the server 102B as in FIG. 11B or at the recording device 102A as in FIG. 11C, to authenticate the attendee device 106.

More particularly, and with reference to FIG. 11B, each of the recording device 102A and the attendee device 106 may send the first and second data 1104 and 1106, respectively, to the server 102B. The first and second data 1104 and 1106 may travel through one or more APs 1108 including, for instance, one or more base stations 1108A and/or one or more wireless APs 1108B, en route to the server 102B.

The server 102B may be configured to determine that the attendee device 106 and the attendee 112 are present at the meeting, e.g., are within a predetermined proximity of the recording device 102A, by comparing the first data 1104 to the second data 1106. For instance, if the images received from the attendee device 106 and the recording device 102A are of the same object, or if the location data received from each indicates the same location, or if the ambient information received from each is the same, or if other "fingerprint" information received from each is the same, the server 102B may determine that the attendee device 106 and the attendee 112 are present at the meeting.

If the server 102B determines that the attendee device 106 and the attendee are present at the meeting, the server 102B may then send a confirmation, depicted at 1110A and 1110B, to the recording device 102A that the attendee device 106 and the attendee 112 have been authenticated.

In some embodiments, the recording device 102A may then issue and send a user identifier and unique meeting identifier to the attendee device 106, e.g., through the one or more APs 1108 or other suitable route, and the attendee device 106 may save the user identifier and the unique meeting identifier as generally described with respect to operations 410 and 412 of FIG. 4A. Alternately or additionally, the recording device 102A and/or attendee device 106 may perform other operations as described herein to be able to associate encrypted audio data with the attendee device 106 for subsequent access by the attendee device 106.

Alternately, as depicted in FIG. 11C, the server 102B may be omitted during comparison of the first data 1104 (not shown in FIG. 11C) and second data 1106. In particular, the attendee device 106 may send the second data 1106 to the recording device 102A. The second data 1106 may be sent to the recording device 102A through the one or more APs 1108 as depicted at 1112A and 1112B, or directly as depicted at 1114.

In these and other embodiments, when the attendee device 106 (and/or attendee devices 108, 110) and the recording device 102A exchange data directly with each other, the data may be exchanged via Bluetooth, NFC, ultrasonic sound waves, RF signals, infrared (IR) signals, or using any other suitable protocol, standard, transmission medium, and/or frequency band.

After capturing the first data 1104 (not shown in FIG. 11C) at the recording device 102A and receiving the second data 1106 from the attendee device 106, the recording device 102A determines that the attendee device 106 and the attendee 112 are present at the meeting by comparing the first data 1104 to the second data 1106 as described above.

In some embodiments, the recording device 102A may then issue and send a user identifier and unique meeting identifier to the attendee device 106, e.g., through the one or more APs 1108 or other suitable route or directly, and the attendee device 106 may save the user identifier and the unique meeting identifier as generally described with respect to operations 410 and 412 of FIG. 4A. Alternately or additionally, the recording device 102A and/or attendee device 106 may perform other operations as described herein to be able to associate encrypted audio data with the attendee device 106 for subsequent access by the attendee device 106.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present inventions have been described in detail, it should be understood that the various changes, substitutions, and alterations could be made hereto without departing from the spirit and scope of the invention.

What is claimed is:

1. A system for secure recording and sharing of audio data, the system comprising:
 a recording device configured to record sound generated at a meeting, the recording device including: a communication interface, a processor, a microphone, an encryption engine, and a heart monitor sensor, wherein
  the processor, included in the recording device, is configured to execute computer readable instructions to register an attendee device associated with an attendee for the meeting,
  the microphone, included in the recording device, is configured to convert the sound generated at the meeting to audio data representing the sound,
  the encryption engine, included in the recording device, is configured to encrypt the audio data, and
  the heart monitor sensor, included in the recording device, is configured to detect a first vital sign of the attendee and generate corresponding first vital sign data, the first vital sign data being used to authenticate the attendee device and the attendee as being present at the meeting by being compared with second vital sign data representing a second vital sign of the attendee, the second vital sign detected by the attendee device during registration of the attendee device at the meeting, wherein the attendee device is separate from the recording device and the heart monitor sensor such that the recording device detects the first vital sign and the attendee device detects the second vital sign; and a storage device configured to store and associate the encrypted audio data with the attendee device for subsequent access by the attendee.

2. The system of claim 1, wherein the storage device is included in a server or the recording device.

3. The system of claim 1, wherein the processor is further configured to execute computer readable instructions to:
  obtain, through the communication interface, location data associated with the recording device;
  generate a meeting record comprising meeting information associated with the meeting, the meeting information including at least one of: a date and time of the meeting, a scheduled location of the meeting, the location data of the recording device, a title of the meeting, and an identifier of the recording device;
  register, through the communication interface, the meeting information with a server that includes the storage device;
  receive, through the communication interface, a unique meeting identifier associated with the meeting from the server; and
  save the unique meeting identifier in the meeting record.

4. The system of claim 3, wherein the processor is configured to execute computer readable instructions to register the attendee device by:
  receiving, through the communication interface, device information from the attendee device, the device information including at least one of: a name associated with the attendee, an identifier of the attendee device, location data of the attendee device, and a public key of the attendee device;
  determining that the attendee device is within a predetermined proximity of the recording device based on the device information;
  issuing a user identifier to the attendee device and saving the user identifier with the device information; and
  sending the user identifier and the unique meeting identifier to the attendee device.

5. The system of claim 1, wherein the first vital sign is a heart rate of the attendee, and the system further comprises at least one of:
  a speaker included in the communication interface, wherein the speaker is configured to emit ultrasonic data signals and the microphone is configured to receive ultrasonic data signals, the emitted and received ultrasonic data signals including information exchanged between the recording device that includes the communication interface and the attendee device present at the meeting during registration of the attendee device;
  a camera configured to capture an image of an object present at the meeting to generate first image data, the first image data being used to authenticate the attendee device as being present at the meeting by comparison with second image data of the object generated by the attendee device during registration of the attendee device; and
  a near field communication (NFC) interface included in the communication interface, the NFC interface configured to exchange data between the recording device and the attendee device present at the meeting during registration of the attendee device.

6. The system of claim 1, wherein the encryption engine is configured to encrypt the audio data:
  with a public key of the attendee device such that the attendee device may subsequently access the encrypted audio data from the storage device and decrypt it using a corresponding private key of the attendee device; or
  with a common cryptographic key which is encrypted by the public key of the attendee device, such that the attendee device may subsequently access the encrypted audio data from the storage device and decrypt it by first decrypting the common cryptographic key using the corresponding private key of the attendee device and then decrypting the encrypted audio data using the common cryptographic key.

7. The system of claim 1, further comprising a speaker identification module configured to generate a file of start and stop times of speakers during the meeting.

8. The system of claim 1, further comprising a proximity module configured to periodically determine during the meeting whether the attendee device is within a predetermined proximity of the recording device that includes the communication interface;
  wherein the encryption engine is configured to record and encrypt the audio data in segments corresponding to intervals between the periodic determinations; and
  wherein only those encrypted audio data segments for which the attendee device was determined to be within the predetermined proximity of the recording device at a beginning of the corresponding interval are associated with the attendee device and the attendee is limited to accessing only those encrypted audio data segments from the meeting with which the attendee device is associated.

9. The system of claim 1, wherein the attendee device is not configured to record the sounds generated at the meeting.

10. A method for secure recording and sharing of recorded data, the method comprising:
  detecting, at a recording device configured to record audio data of a meeting, one or more first vital signs associated with an attendee of the meeting, the one or more first vital signs represented by first data;
  registering an attendee device associated with the attendee of the meeting after an authentication that the attendee device and attendee are present at the meeting, the authentication based on determining that the attendee device and the attendee are present at the meeting by comparing the first data to second data, the second data representing one or more second vital signs of the attendee detected by the attendee device, wherein the attendee device is separate from the recording device such that the recording device detects the first vital sign and the attendee device detects the second vital sign;
  recording audio data during the meeting;
  encrypting the audio data; and
  associating the encrypted audio data with the attendee device for subsequent access by the attendee.

11. The method of claim 10, further comprising:
  receiving, at the recording device from the attendee device, the second data representing the second vital signs of the attendee detected by the attendee device.

12. The method of claim 10, further comprising:
sending the first data to a server configured to receive, from the attendee device, a device identifier and the second data representing the second vital signs of the attendee detected by the attendee device;
receiving confirmation from the server that the attendee device and the attendee have been authenticated, the confirmation including the device identifier; and
sending, to the attendee device, a meeting identifier and user identifier assigned to the attendee.

13. The method of claim 10, further comprising:
obtaining location data associated with the recording device used to record the audio data;
generating a meeting record comprising meeting information associated with the meeting, the meeting information including at least one of: a date and time of the meeting, a scheduled location of the meeting, the location data of the recording device, a title of the meeting, and an identifier of the recording device;
registering the meeting information with a server;
receiving a unique meeting identifier associated with the meeting from the server; and
saving the unique meeting identifier in the meeting record.

14. The method of claim 13, wherein registering the attendee device associated with the attendee for the meeting comprises:
receiving, from the attendee device, device information including at least one of: a name associated with the attendee, an identifier of the attendee device, location data of the attendee device, and a public key of the attendee device;
determining that the attendee device is within a predetermined proximity of the recording device based on the device information;
issuing a user identifier to the attendee device and saving the user identifier in the meeting record together with the device information; and
sending the user identifier and the unique meeting identifier to the attendee device.

15. The method of claim 14, further comprising:
periodically determining during the meeting whether the attendee device is within the predetermined proximity of the recording device;
recording and encrypting the audio data in segments corresponding to intervals between the periodic determinations;
associating only those encrypted audio data segments with the attendee device for which the attendee device was determined to be within the predetermined proximity of the recording device at a beginning of the corresponding interval; and
uploading the encrypted audio data segments to the server with association data, the association data indicating the encrypted audio data segments associated with the attendee device, wherein the attendee is limited to accessing from the server only those encrypted audio data segments from the meeting with which the attendee device is associated.

16. The method of claim 15, wherein the attendee device is configured to subsequently access the encrypted audio data at the server by:
sending the unique meeting identifier and the user identifier to the server to request a list of recorded data associated with the attendee device;
receiving a list of encrypted audio data segments corresponding to the unique meeting identifier and the user identifier;
sending a request for at least one of the encrypted audio data segments;
receiving the at least one of the encrypted audio data segments;
decrypting the at least one of the encrypted audio data segments with a private key of the attendee device to generate decrypted audio data; and
rendering the decrypted audio data.

17. A method for secure recording and sharing of recorded data, the method comprising:
authenticating an attendee device associated with an attendee as being present at a beginning of a meeting;
periodically determining during the meeting whether the attendee device is within a predetermined proximity of a recording device that records audio data generated at the meeting;
recording and encrypting, by the recording device, the audio data in segments corresponding to intervals between the periodic determinations such that a first encrypted audio data segment and a second encrypted audio data segment are produced;
associating only those encrypted audio data segments with the attendee device for which the attendee device was determined to be within the predetermined proximity of the recording device during the corresponding interval such that the attendee device is associated with the first encrypted audio data segment and not associated with the second encrypted audio data segment; and
uploading the encrypted audio data segments to a server with association data, the association data indicating the encrypted audio data segments associated with the attendee device, wherein the attendee is limited to accessing from the server only those encrypted audio data segments from the meeting with which the attendee device is associated such that the first encrypted audio data segment is accessible by the attendee and the second encrypted audio data segment is not accessible by the attendee.

18. The method of claim 17, wherein authenticating the attendee device and attendee as being present at the meeting comprises:
broadcasting a first ultrasonic data signal including a public key of the recording device that records the audio data and a unique meeting identifier of the meeting;
receiving, from the attendee device, a second ultrasonic data signal including a public key of the attendee device and an identifier of the attendee device, both encrypted with the public key of the recording device; and
decrypting the public key of the attendee device and the identifier of the attendee device with a private key of the recording device that corresponds to the public key of the recording device.

19. The method of claim 17, wherein authenticating the attendee device and attendee as being present at the meeting comprises:
capturing, at the recording device that records the audio data, first data representing at least one of: a first image of an object present at the meeting, location data representing a location of the recording device, or ambient information associated with the location of the recording device;
sending the first data to the server, the server configured to receive, from the attendee device, second data captured by the attendee device, the second data representing at least one of: a second image of the object present at the meeting, location data representing the location of the attendee device, or ambient information associated with the location of the attendee device;

wherein the server is further configured to determine that the attendee device and attendee are present at the meeting by comparing the first data to the second data; and receiving confirmation from the server that the attendee device and the attendee have been authenticated.

20. The method of claim 17, wherein authenticating the attendee device and attendee as being present at the meeting comprises:

capturing, at the recording device that records the audio data, first data representing at least one of: a first image of an object present at the meeting, location data representing a location of the recording device, or ambient information associated with the location of the recording device;

receiving, from the attendee device, second data captured by the attendee device, the second data representing at least one of: a second image of the object present at the meeting, location data representing a location of the attendee device, or ambient information associated with the location of the attendee device; and determining that the attendee device and attendee are present at the meeting by comparing the first data to the second data.

21. The method of claim 17, wherein authenticating the attendee device and attendee as being present at the meeting comprises:

obtaining, at the recording device that records the audio data, location data for the recording device;

receiving, from the attendee device through a near field communication (NFC) interface of the recording device, location data for the attendee device; and determining that the attendee device is within the predetermined proximity of the recording device based on the location data for the recording device and the location data for the attendee device.

* * * * *